(No Model.)
B. CRAWFORD.
LEVER ATTACHMENT FOR BRAKE WHEELS.
No. 490,543. Patented Jan. 24, 1893.
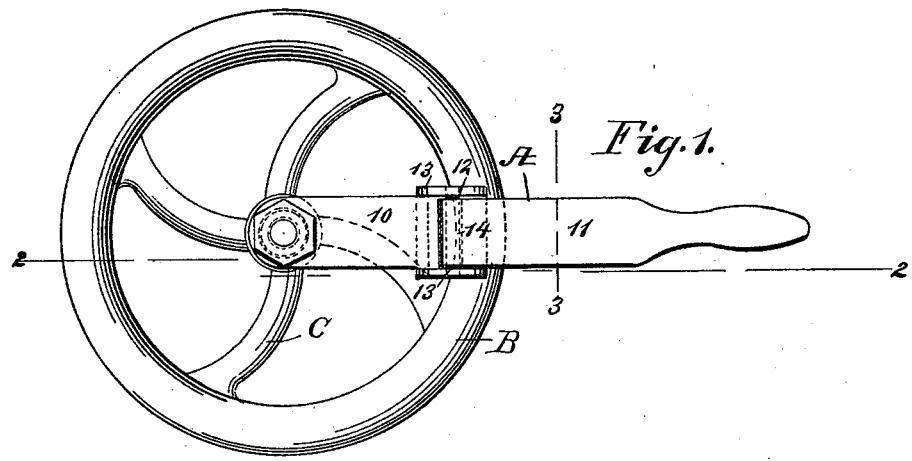
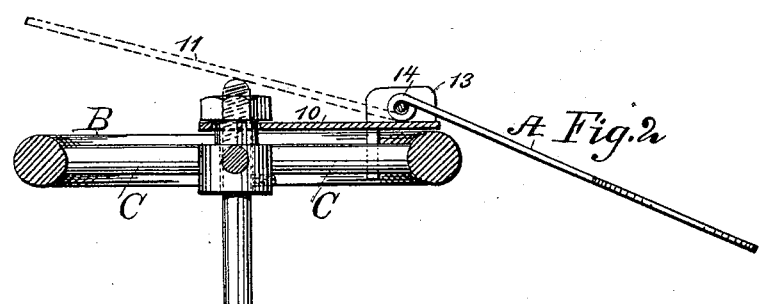
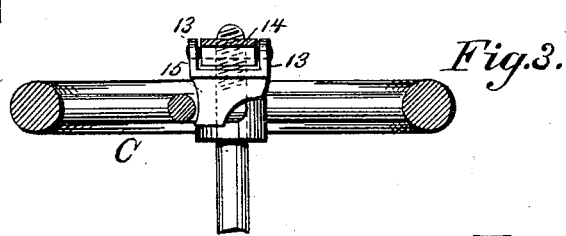
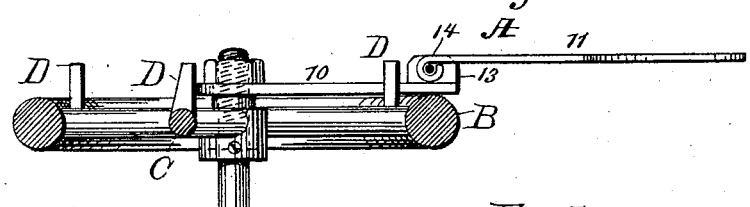
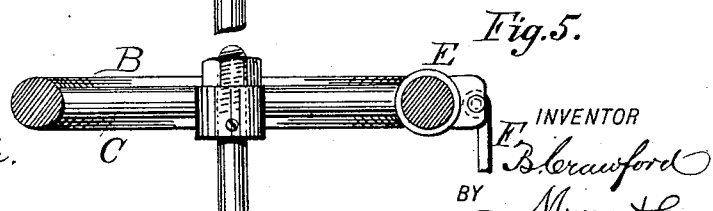
WITNESSES:
INVENTOR
B. Crawford
BY Munn & Co
ATTORNEYS.

UNITED STATES PATENT OFFICE.

BENJAMIN CRAWFORD, OF LOUISVILLE, KENTUCKY.

LEVER ATTACHMENT FOR BRAKE-WHEELS.

SPECIFICATION forming part of Letters Patent No. 490,543, dated January 24, 1893.

Application filed November 22, 1892. Serial No. 452,822. (No model.)

*To all whom it may concern:*

Be it known that I, BENJAMIN CRAWFORD, of Louisville, in the county of Jefferson and State of Kentucky, have invented a new and useful Improvement in Lever Attachments for Brake-Wheels, of which the following is a full, clear, and exact description.

My invention relates to a lever attachment for brake wheels, and it has for its object to provide a means whereby a brake wheel, especially the wheels forming a portion of the brake system of railway and other cars, may be more expeditiously and conveniently manipulated than heretofore, and whereby also the brake or brakes when applied may be set with much more force than it is possible to obtain through the medium of the ordinary wheel.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a plan view of a brake wheel having the invention applied thereto; Fig. 2 is a section taken essentially on the line 2—2 of Fig. 1; Fig. 3 is a section through the lever, taken practically on the line 3—3 of Fig. 1, a portion of the wheel being broken away; Fig. 4 is a section through the wheel, illustrating the lever in side elevation, a modified form of lever being shown; and Fig. 5 is a section similar to Fig. 4, illustrating a further modification of the lever applied to the wheel.

In carrying out the invention the lever A, is applied to a wheel B, in such a manner as to facilitate the expeditious and convenient turning of the wheel, and preferably the lever is made to engage with and act upon the spokes C of the wheel, or as shown in Fig. 4, an engagement is effected with pins or projections D, projected from the spokes.

The lever in its preferred form is shaped as shown in Figs. 1, 2 and 3, in which the lever is made in two sections 10 and 11, the two sections being connected by a hinge 12, of any approved shape. Preferably, however, in effecting a connection between the two sections of the lever, the inner section is bent upward at its edges in a manner to produce ears 13, and the inner end of the outer or handle section of the lever is provided with an eye 14, receiving a pintle which is passed through the ears, and the inner section 10 of the lever has projected downward from its under side a finger 15, best shown in Fig. 3, the said finger having one edge preferably made practically straight or slightly recessed, as shown in said Fig. 3, and the other or opposite side is cut away, in order that it may pass readily over the spokes.

In the operation of this form of the lever, when the brake is to be applied, the sections of the lever are folded out one from the other, and the lever is turned around until the practically straight edge of the finger 15, is brought into engagement with one of the spokes, and then the wheel is revolved by power being applied to the lever, and the brake connected with the wheel may be set with much more force than if the power were applied directly to the wheel, since the hand of the operator is liable to slip when applied to the wheel and an uncertain purchase is obtained, while when the lever is employed considerable force may be brought to bear against the lever and a firm hold may be obtained. When the lever is not in use the outer section of the lever may be turned over upon the inner section, as shown in dotted lines in Fig. 2.

In Fig. 4, where the points D, are employed, located upon the spokes, the finger 15, is omitted, as the inner section of the lever may be brought to bear directly against a pin; but when the finger is employed a decided recess in one side is made, in order that the lever may be carried backward to engage with any particular spoke in a ready manner, as the inner end of the lever is pivotally connected in an exceedingly loose manner with the brake shaft, or with a boss or other projection formed upon the center of the wheel.

In Fig. 5 a further modification of the lever is illustrated, and this form of lever consists in securing upon the rim of the brake wheel a sleeve E, to which sleeve a handle F, is pivotally secured.

Having thus described my invention, I claim as new and desire to secure by Letters Patent,—

1. The combination with a brake wheel, of a lever formed of two sections, the inner section being pivotally connected with the wheel and adapted to engage the wheel to turn it and provided with ears, and an outer section provided with an eye to receive a pivot pin passed through the said ears, substantially as described.

2. A lever attachment for brake wheels, consisting of an inner section provided with ears at its outer end and with a finger projecting from its under side, and an outer section provided with an eye to receive a pivot pin passed through the said ears, substantially as set forth.

BENJAMIN CRAWFORD.

Witnesses:
ROWLAND COBB,
OTTO SEELBACH.